US012042821B1

(12) United States Patent
Butler

(10) Patent No.: US 12,042,821 B1
(45) Date of Patent: Jul. 23, 2024

(54) SQUIRTER TRANSDUCER

(71) Applicant: The United States of America as represented by the Secretary of the Navy, Newport, RI (US)

(72) Inventor: Stephen C Butler, Portsmouth, RI (US)

(73) Assignee: The Government of the United States of America as represented by the Secretary of the Navy

( * ) Notice: Subject to any disclaimer, the term of this patent is extended or adjusted under 35 U.S.C. 154(b) by 218 days.

(21) Appl. No.: 17/737,099

(22) Filed: May 5, 2022

(51) Int. Cl.
*B06B 1/06* (2006.01)
*B06B 1/02* (2006.01)

(52) U.S. Cl.
CPC .......... *B06B 1/0655* (2013.01); *B06B 1/0238* (2013.01)

(58) Field of Classification Search
CPC ............................ B06B 1/0655; B06B 1/0238
See application file for complete search history.

(56) References Cited

U.S. PATENT DOCUMENTS 5,001,932 A * 3/1991 Light .................... G01N 29/28 73/644

* cited by examiner

*Primary Examiner* — Luke D Ratcliffe
*Assistant Examiner* — Abdallah Abulaban
(74) *Attorney, Agent, or Firm* — James M. Kasischke; Michael P. Stanley; Jeffry C. Severson

(57) ABSTRACT

A squirter sonar transducer is provided as a body having a first end and a second end. The body is a cylindrical wall having a length and an inner diameter with a piezoelectric ring actuator disposed within the cylindrical wall. A baseplate is connected to the first end of the body and caps the first end. The second end of the body is open to define a resonator cavity within the body. The baseplate is made of a solid mass having a thickness of approximately fifty percent of the length of the cylindrical wall and has a recess approximately fifty percent of the thickness with a recess diameter equal to the inner diameter of the cylindrical wall.

1 Claim, 10 Drawing Sheets

-PRIOR ART-

-PRIOR ART-

-PRIOR ART-

SQUIRTER TRANSDUCER

STATEMENT OF GOVERNMENT INTEREST

The invention described herein was made in the performance of official duties by employees of the United States Department of the Navy and may be manufactured, used, or licensed by or for the Government of the United States for any governmental purpose without payment of any royalties thereon.

BACKGROUND OF THE INVENTION

1) Field of the Invention

The present invention is directed to a squirter sonar transducer having a reduced resonant frequency.

2) Description of the Related Art

A squirter sonar transducer consists of a piezoelectric (or magneto-strictive) ring or cylinder actuator which is open at one end and is capped with a comparatively-heavy mass at the other end. Acoustic pressure on the inside of the ring radiates "squirts" outward when the ring contracts. As such, acoustic pressure on the inside of a piezoelectric ring actuator compresses and is rarefied as the ring contracts and expands. This motion impacts the fluid medium through one end of the ring.

The other end of the ring is capped with a comparatively heavy mass to prevent movement in the opposite direction. The outside of the piezoelectric ring can be enclosed by a pressure release material such as closed cell foam rubber, cork/rubber, or air or by a rigid cylinder such as a steel, aluminum or fiberglass shell to prevent radiation from the surface.

FIG. 1 depicts a prior art sonar transducer 102. The sonar transducer 102 is referred to as a "squirter" transducer because of the motion of acoustic pressure in and out of cavity 200. In the figure, the transducer 102 has a piezoelectric ring 104 positioned slightly above a heavy mass 106. The mass 106 blocks acoustic pressure from one side of the piezoelectric ring 104. The mass 106 can also be used to mount the sonar transducer 102 to various baffles and structures.

The volume inside the piezoelectric ring 104 forms a cavity 200. The cavity 200 resonates in a manner that is similar to a Helmholtz resonator with no mechanical neck or as an open-closed organ pipe. The resonance frequency for the piezoelectric ring 104 is calculated by the ratio of the speed of sound in the ring material divided by a mean circumference of the ring. The cavity 200 may be flooded with surrounding water, fluid or by another fluid such as oil and sealed within a rubber boot.

The sonar transducer 102 has aspects similar to an open-close ended cylindrical pipe. A cylindrical pipe resonates when the length of the pipe is equal to a quarter wavelength. Pressure variations do not drop to zero at the opening of the pipe but rather at a distance beyond the length of the pipe. Thus, a pipe having a length "L" has an acoustic length which is slightly greater than a physical length of the pipe.

For a cylindrical pipe of radius "r", the additional length "Δl" is the end correction and is "0.61r" for a no-flange open pipe and "0.85r" for a flanged ended pipe. This amount is added to the length of the pipe in order to obtain the total acoustic length "$L_T$". For the open-closed ended pipe, the resonance frequency is $f_{o-c}=c_o/4L_T$, where $L_T=L+\Delta l$ and "$C_o$" is the speed of sound in the fluid (for water, approximately 1500 meters per second).

SUMMARY OF THE INVENTION

The invention disclosed herein describes how to reduce the resonant frequency of a squirter sonar transducer by how the transducer is fabricated.

In the invention, an improved squirter transducer is provided for a reduced resonant frequency. The transducer includes a cylindrical body having a length and an inner diameter. An inner wall of the cylindrical body includes a piezoelectric ring actuator and a center wall is a pressure release material and an outer wall is a rigid cylinder. A baseplate connects to a first end of the cylindrical body.

The baseplate is a solid mass having a thickness of approximately fifty percent of the length of the cylindrical body and has a recess of approximately fifty percent of the thickness with a recess diameter equal to the inner diameter of the cylindrical body. The baseplate recess thickness can be adjusted to obtain the desired resonant frequency. A portion of the pressure release material is located between the piezoelectric ring actuator and the baseplate to enable the piezoelectric ring to move freely. The pressure release between the actuator and the baseplate is used as a vibration isolation so that the piezoelectric ring is free to vibrate back and forth.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 2:
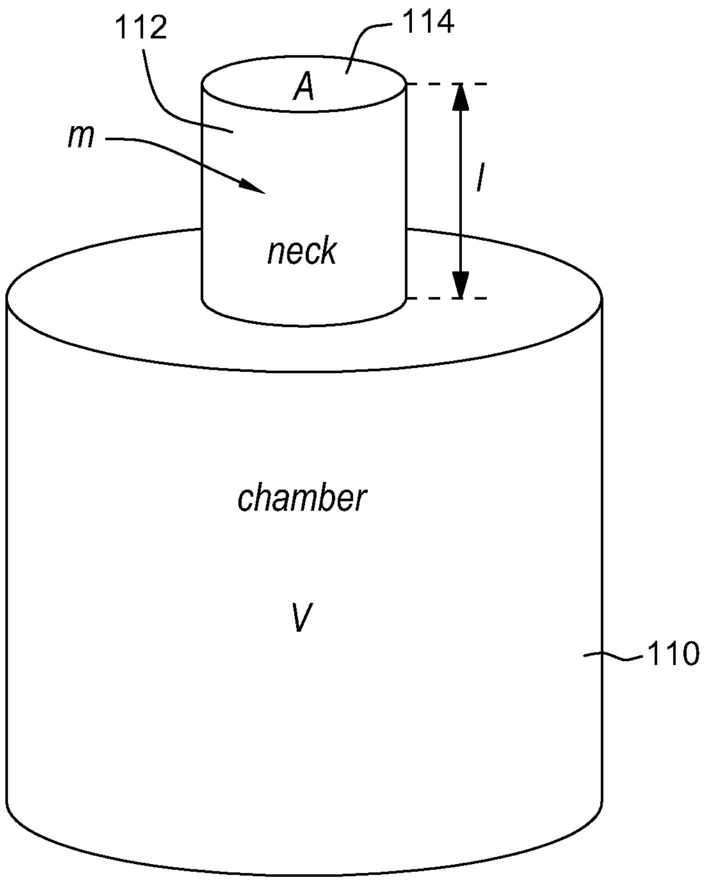
FIG. 2 is a perspective view of a Helmholtz resonator with a resonator chamber and neck.

FIG. 2 depicts a known passive Helmholtz resonator with a chamber 110 and a neck 112. The chamber 110 has a fluid volume "V" which acts as a compliance or spring with the neck 112 serving as a piston with a mass "m". A resonance is developed from the fluid compliance, "$C_c$" in a camber vibrating with a column of water in the neck 112 acting as a mass "m=ρAl" where "l" is the length of the neck, "A" is the area of a port 114 (i.e. $\pi r^2$) and "ρ" is the density of the fluid in the neck. Since this is a passive Helmholtz resonator; resonance occurs when an acoustic pressure passes over the port 114.

Figure 3:
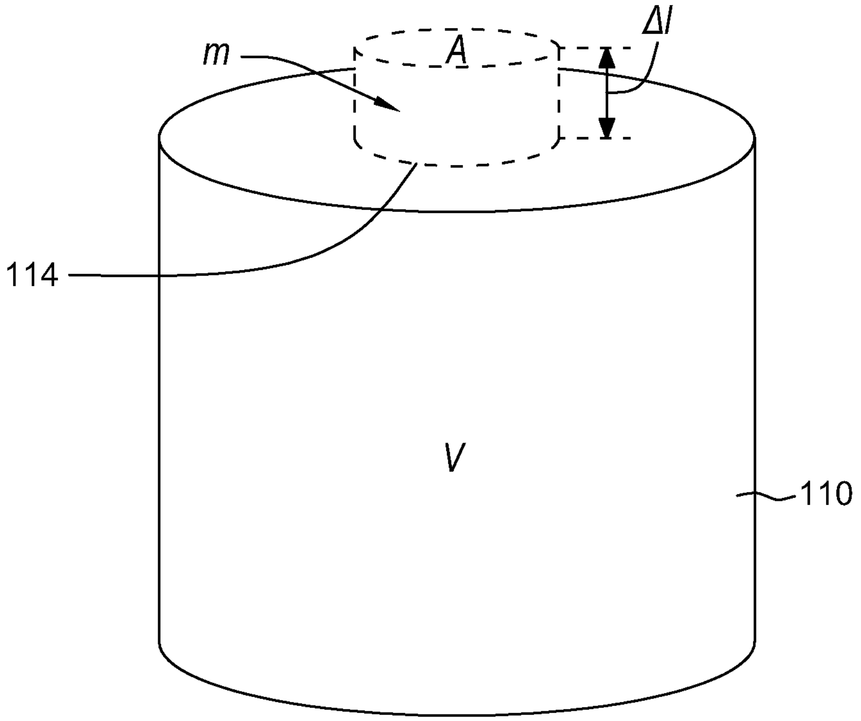
FIG. 3 is a perspective view of a Helmholtz resonator with a resonator chamber, no neck and a comparatively small port hole.
Figure 4:
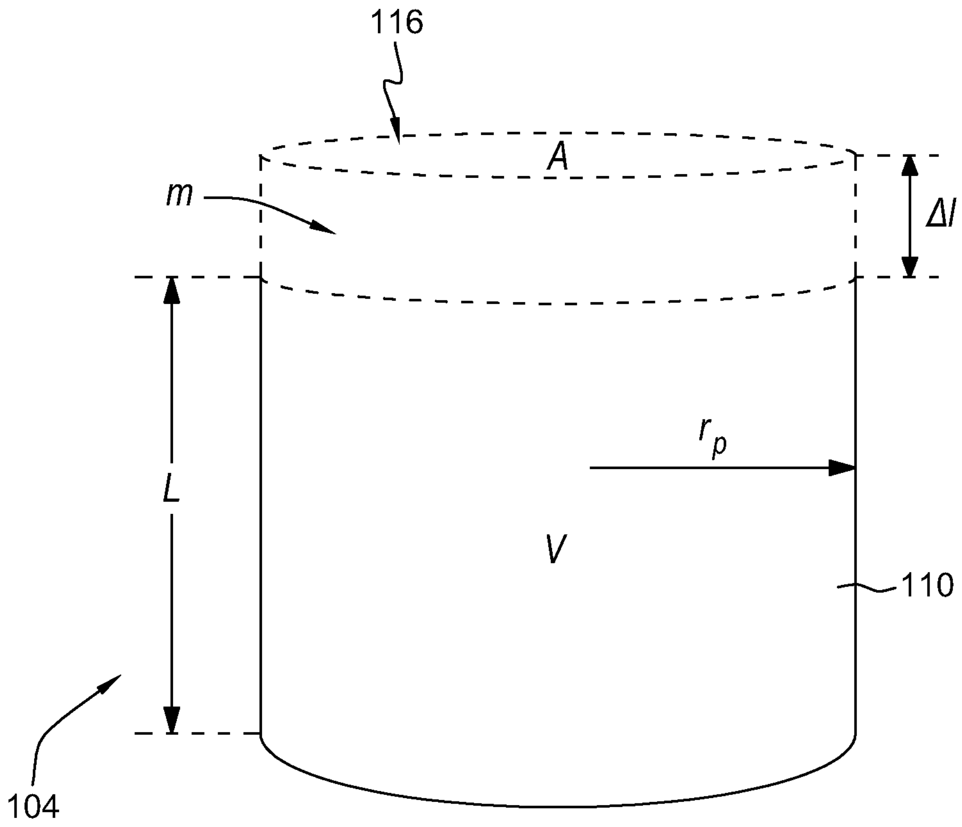
FIG. 4 is a perspective view of a Helmholtz resonator with a resonator chamber and a comparatively large port hole.

FIG. 3 depicts a modified Helmholtz resonator with the chamber 110 and no neck. The port 114 has a mass extending into the fluid with an end correction "Δl". As shown in FIG. 4, if the inner diameter of the port 114 extends to the same diameter as the chamber 110, then there is essentially the sonar transducer 102 as shown in FIG. 1.

Figure 1:
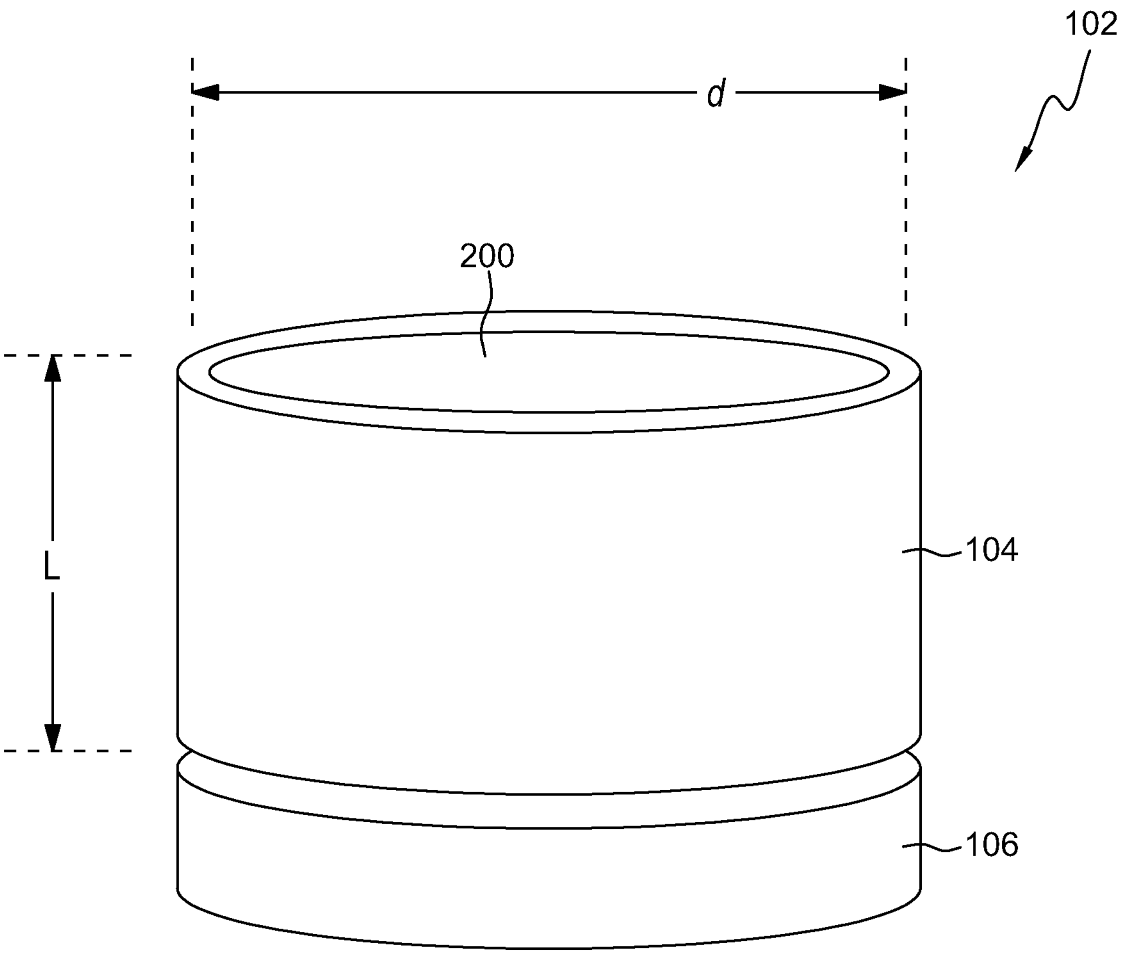
FIG. 1 is a perspective view of a prior art sonar transducer.

FIG. 4 depicts a passive resonator where the resonance is excited by acoustic pressure passing over the port 114 whereas in FIG. 1, the resonance is excited by the piezoelectric actuator ring expanding and contracting.

In such a sonar transducer, the chamber 110 is formed as a piezoelectric ring cavity 116. The compliance of the fluid within the chamber 110 is provided in Equation (1) as:

$$C_c = L/\beta A_p \tag{1}$$

where "L" is the length of the piezoelectric ring cavity 116; "$A_p$" is the port area of the inner diameter of the piezoelectric ring 104 (i.e., $\pi r_2^2$, where $r_p$ is the inner radius of the piezoelectric ring); and "β" is the bulk modulus of the fluid $\rho_o c_o^2$; where "$\rho_o$" is density of the fluid (for water, 1000 kg/m$^3$) and "$c_o$" is the speed of sound in the fluid (for water, approximately 1500 m/s).

The cavity compliance, in terms of fluid volume, is $V_c/\beta A_p^2$, where the fluid volume "$V_c$" is "$A_p L$". The column of water mass "$M_p$" adjacent to the open port of the ring cavity with length $\Delta l = 8r_p/3\pi = 0.85r_p$ is given by Equation (2):

$$M_p = \Delta l \rho_o A_p = \frac{8r_p}{3\pi}\rho_o A_p = 2.67 r_p^3 \rho_o \tag{2}$$

This mass is a same as the radiation mass impedance of a piston in a baffle at low frequencies kr<0.5, where "k" is the wavenumber equal to $2\pi f/c_o$ and "f" is frequency.

The column mass length is $\Delta l = 0.61 r_p$ for an open end pipe with no flange and the mass is given by Equation (3) as:

$$M_p = \Delta l \rho_o A_p = 0.61 r_p \rho_o A_p = 1.92 r_p^3 \rho_o \tag{3}$$

The natural frequency "$f_c$" of vibration of a Helmholtz resonator is given by Equation (4) as:

$$f_c = \frac{1}{2\pi}\sqrt{\frac{1}{C_c M_p}} \tag{4}$$

Figure 5:
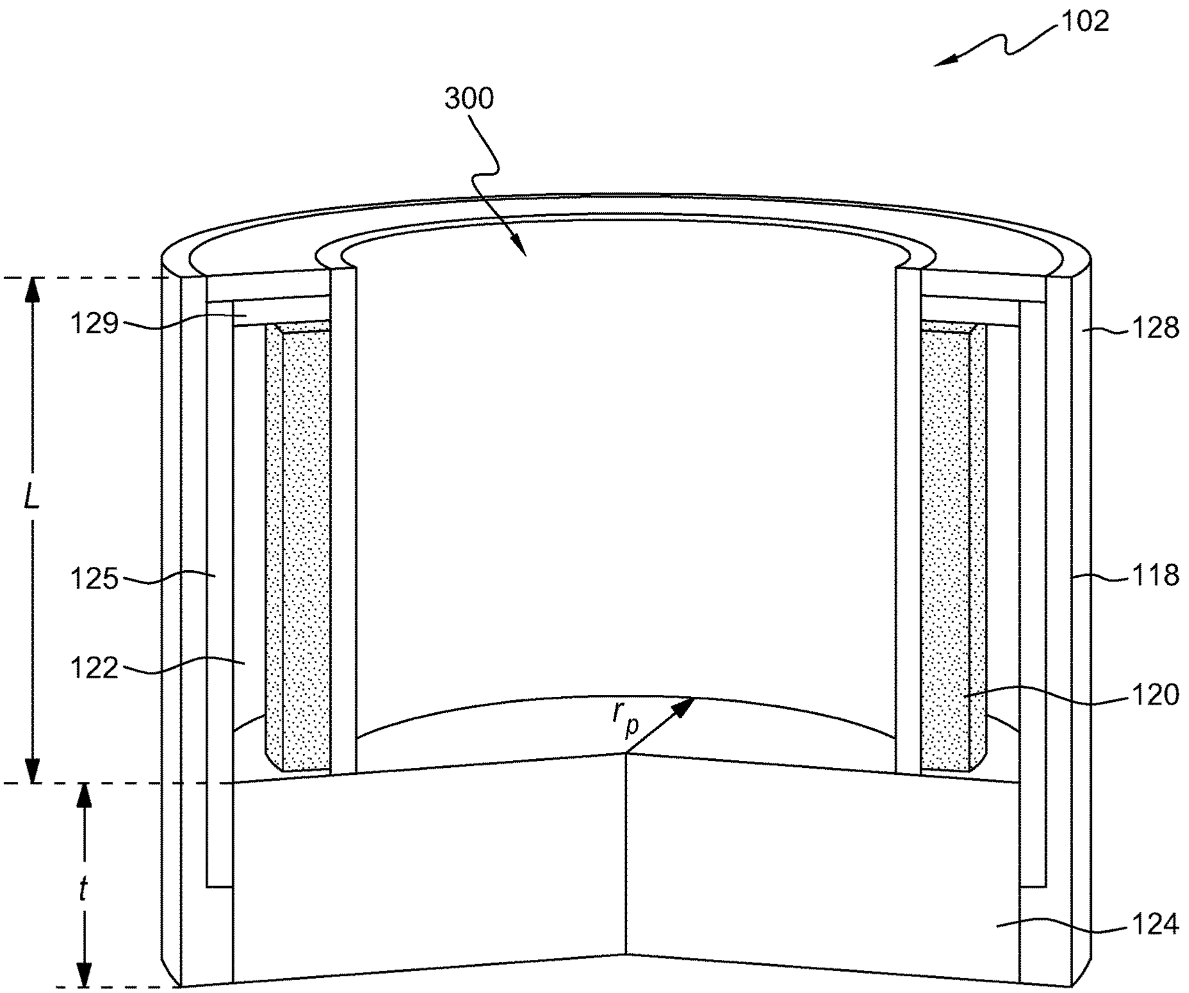
FIG. 5 is a cutaway view of a prior art sonar transducer.
Figure 6:
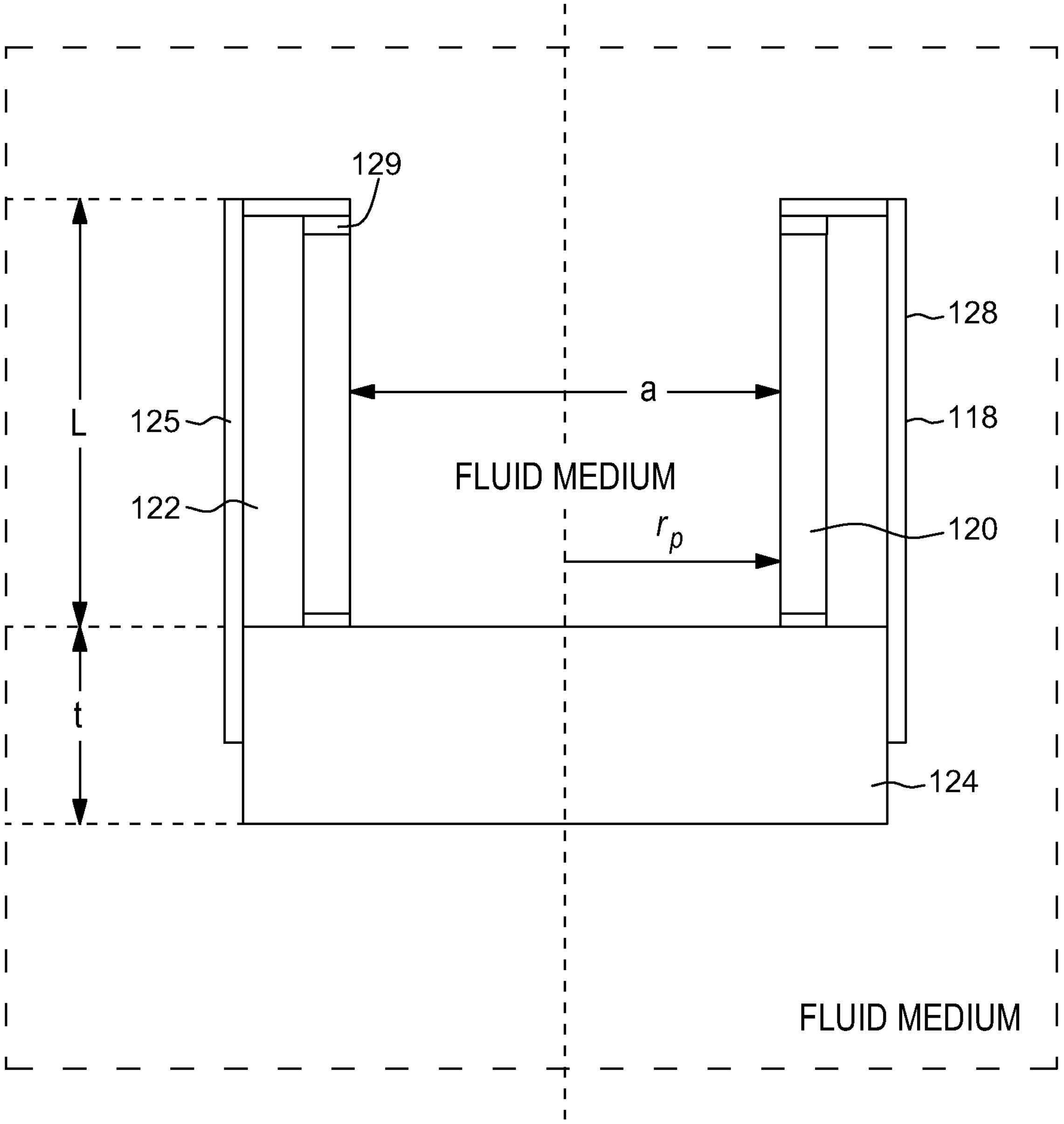
FIG. 6 is a side view of the prior art sonar transducer of FIG. 5.

Referring to FIG. 5 and FIG. 6, the prior art sonar transducer 102 includes a cylindrical body 118 having a piezoelectric ring or cylinder 120 on an inner diameter, pressure release material 122 or air in a void between a rigid cylindrical shell as the outer diameter. A thin ring of pressure release material is affixed to a first and second end of the piezoelectric ring 120 to allow vibration of the piezoelectric ring within a gap between the first end and a baseplate 124 as well as a gap between the second end and a waterproof coating 128.

The solid and heavy mass baseplate 124 connects to a base of the cylindrical body 118 and is encompassed by a rigid cylindrical shell 125. The opposite end of the cylindrical body 118 is covered by a rigid thin ring or washer 129. The cylindrical body 118 and baseplate 124 form a cavity 300 having a length "L" and an inner diameter "a" with the diameter that is twice the radius $r_p$.

The resonance frequency "$f_r$" of the piezoelectric ring actuator 120 is calculated by the ratio of the speed of sound in the ring material divided by the mean circumference of the ring $2\pi r_m$, where "$r_m$" is the mean radius of the piezoelectric ring actuator and is given by Equation (5) as:

$$f_r = \frac{c_{pzt}}{2\pi r_m} \tag{5}$$

where "$c_{pzt}$" is the speed of sound in the piezoelectric material. The resonant frequency of a squirter transducer is reduced without increasing the diameter and length of the cylinder or by reducing the size, while maintaining the same resonant frequency becausing increasing the size of the cavity.

Figure 7:
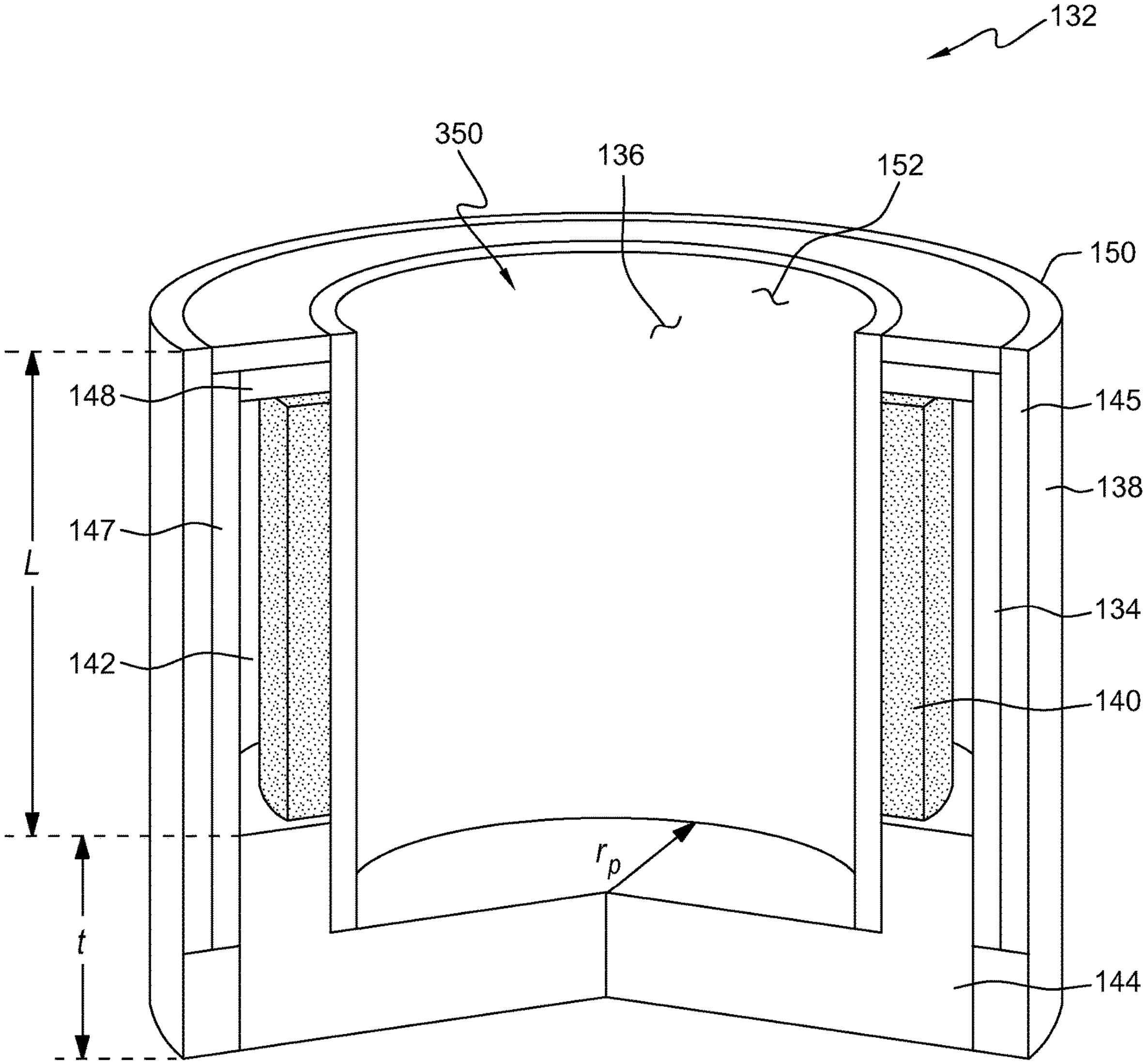
FIG. 7 is a cutaway view of a squirter transducer according to the present invention.

Referring now to FIG. 7, a squirter transducer 132 includes a cylindrical body 134 having an inner wall 136 and an outer wall 138. The inner diameter or inner wall 134 includes a piezoelectric ring actuator 140 and pressure release material 142 and the outer wall 138 is a rigid cylindrical shell. The pressure release material 142 or air in a void between the outer wall 138 as the outer diameter and the piezoelectric ring actuator 140 as the inner diameter.

A thin ring of pressure release material is affixed to a first and second end of the piezoelectric ring actuator 140 to allow vibration of the piezoelectric ring within a gap between the first end and a baseplate 144 as well as a gap between the second end and a waterproof coating 145.

The solid and heavy mass baseplate 144 connects to a base of the cylindrical body 134 and is encompassed by a rigid cylindrical shell 147. The opposite end of the cylindrical body 134 is covered by a rigid thin ring or washer 148. The cylindrical body 118 and the baseplate 144 form a cavity 300 having a length "L" and an inner diameter "a" with the diameter that is twice the radius $r_p$.

The piezoelectric ring actuator 140 may be a ceramic cylinder having an inner diameter "a" (the diameter is twice the radius $r_p$). The pressure release material 142 extends over and under the piezoelectric ring actuator 140. The rigid cylindrical shell extends over the pressure release material 142.

The piezoelectric ring actuator 140 is positioned slightly above the baseplate 144 for pressure release material over a gap. The second end 150 of the piezoelectric ring 140 has the pressure release material on a top face and over which is a rigid ring or washer is an open outlet 152 that defines a resonator cavity 350 within the cylindrical body 134. The baseplate 144 blocks acoustic pressure from one side of the piezoelectric ring actuator 140 so that the acoustic energy is directed toward the open outlet 152.

The baseplate 144 is a mass having a thickness "t", equal to approximately fifty percent of the length "L" of the cylindrical body 134. The baseplate 144 is chosen to be heavy by the thickness of the baseplate so that no motion is generated from this size. The recessed baseplate affects the resonance by an enlarged cavity and therefore reduces the frequency.

The baseplate 144 has a top and a recess extending from the top to approximately fifty percent of the thickness "t" of the baseplate 144. The diameter of the recess is equal to the inner diameter "a" of the piezoelectric ring 140.

Figure 8:
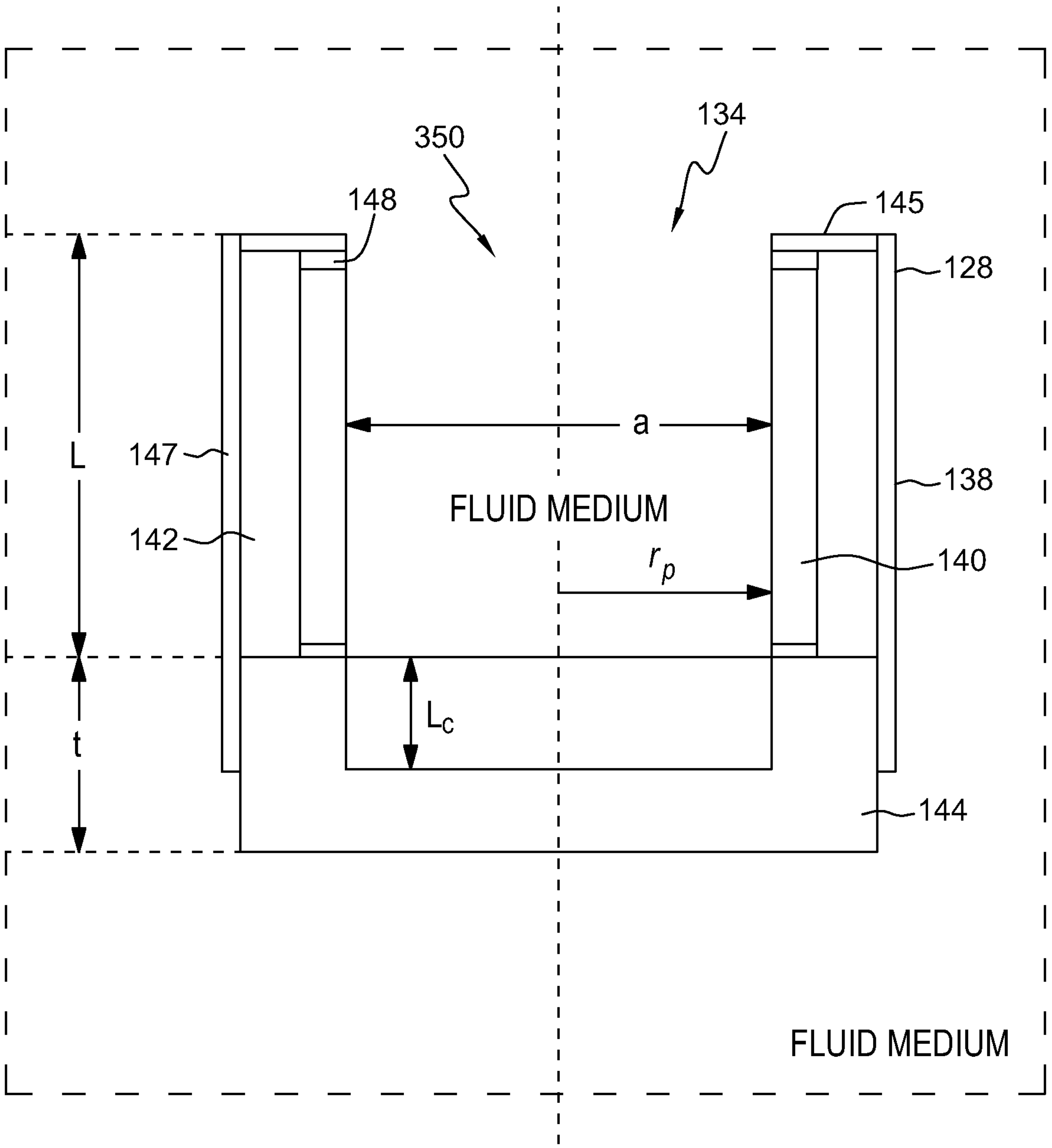
FIG. 8 is a side view of the squirter transducer of FIG. 7.

Referring now to FIG. 8, the cylindrical body 134 and the baseplate 144 form the resonator cavity 350. By adding the recess to the baseplate 144; the effective length (or height) of the resonator cavity 350 can be increased. An increased resonator cavity 350 increases the bulk compliance and therefore reduces the cavity resonance frequency but does not increase the overall length of the squirter transducer 132.

For an open-closed ended pipe, adding a counter bore to the closed end of the pipe increases the total length by "$L_c$". Now, the total length of the resonator cavity 350 is $L_T$=L+Δl+$L_c$, which reduces the resonance frequency. For a Helmholtz resonator with no neck; the counter bore adds an additional compliance $C'_c$ to the cavity compliance $C_c$, which increases the compliance to $C_c$+$C'_c$ and which also reduces the resonance frequency.

Figure 9:
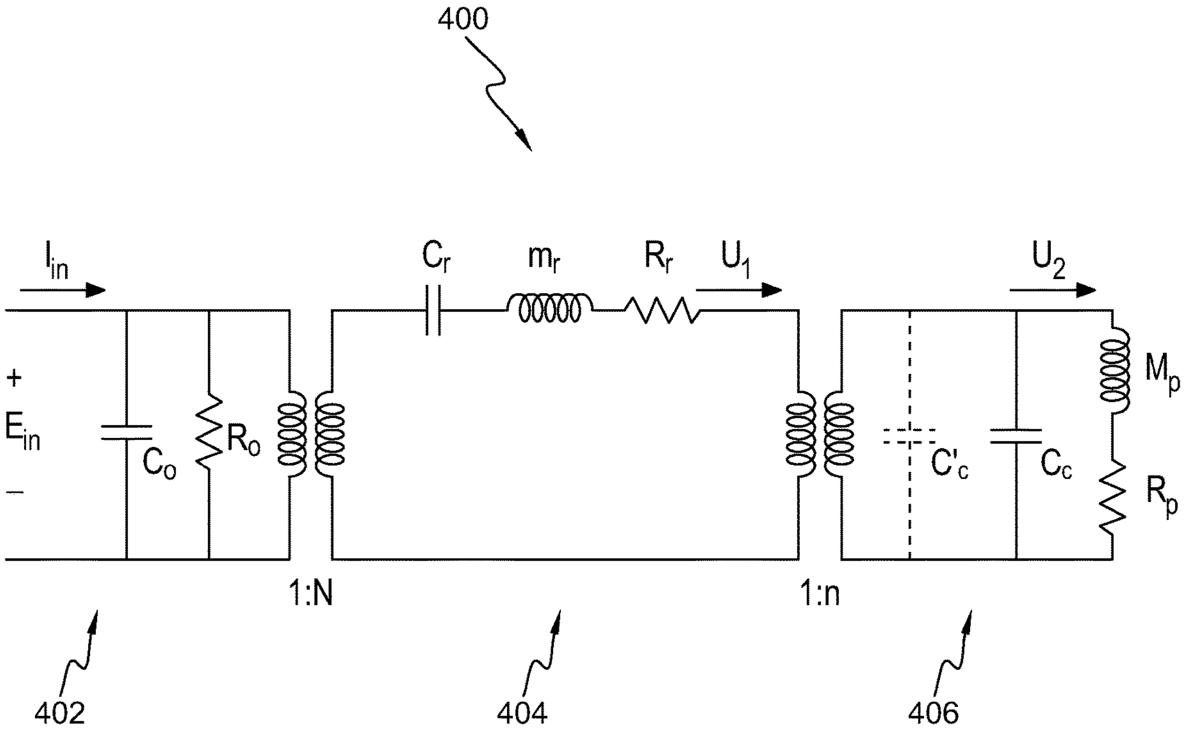
FIG. 9 depicts an equivalent electrical circuit for a squirter transducer according to the present invention.

In FIG. 9, the squirter transducer 132 is represented by an equivalent electrical circuit 400. The electrical circuit 400 can predict the first order electroacoustic behavior of the squirter transducer 132. This simplified equivalent electrical circuit 400 includes an electrical impedance section 402, a mechanical ring resonance section 404 and a cavity resonance section 406. The electrical impedance section 402 includes the dielectric electrical losses "Ro", blocked or clamped capacitance "Co", associated with the piezoelectric ring actuator 140, and an idealized electro-mechanical transformer, "N" that converts the drive voltage into a mechanical force.

The ring resonance section 404 includes: a piezoelectric ring compliance "$C_r$", a ring mass "$m_r$"; a mechanical radiation impedance "$R_r$"; and a ring velocity "$u_1$". The cavity resonance section 406 includes the fluid compliance "$C_c$", the port radiation mass "$M_p$", the resistance, $R_p$, and the port velocity "$u_2$". The turns ratio "n" is the ratio of velocities $u_1/u_2$ or areas $A_p/A_r$, where area "$A_r$" is the outer surface area of the ring ($2r_{od}\pi L$) and where "$r_{od}$" is the outer radius of the ring.

The electrical inputs are the drive voltage "$E_{in}$" and current "$I_{in}$" which converts into mechanical force and velocity through the idealized electro-mechanical transformer "N". Adding an additional compliance "$C'_c$" introduced by the counter bore would be in parallel with the cavity fluid compliance "$C_c$" which reduces the resonance frequency.

A sonar transducer with a solid mass baseplate can be compared to a squirter transducer having a counter bore in the baseplate. A two-dimensional axisymmetric modeling approach was used to model the piezoelectric ring, heavy base mass, and fluid loading, which are shown in FIG. 6 and FIG. 8, respectively.

The fluid encloses and couples to the structural elements. The model has a region (not shown) which absorbs the acoustic radiation from the fluid region without producing reflections. The fluid region has a one meter radius and is considered a far field radiation condition. Sonar transducers that are projectors are characterized by their transmitting voltage response, which is the far field acoustic pressure referenced to one meter for one volt applied to the input terminals of the transducer.

Figure 10:
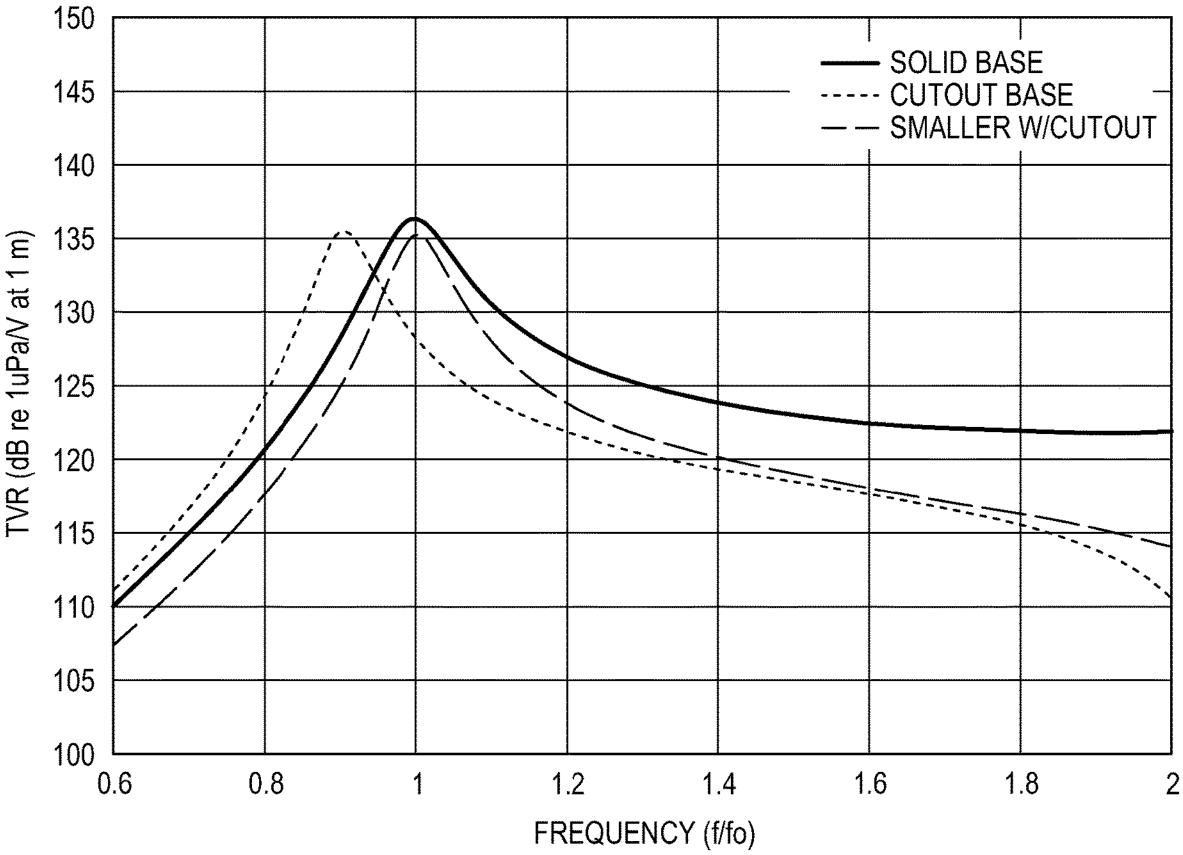
FIG. 10 is a graph of a transducer transmit voltage response versus frequency for the squirter transducer of the present invention.

The circuit of FIG. 10 shows that the modeled squirter transducers transmit voltage responses (TVR) at one meter above the open-end cavity for a squirter transducer with a solid base plate, with the counter bore (recess) in the base plate and a smaller transducer design with a counter bore in the base plate.

Table 1 lists cavity resonances and design sizes normalized by the resonance frequency "$f_o$" in kHz of the squirter transducer without the recess. In the table, the piezoelectric (PZT) ring dimensions are the outer diameter (OD), inner diameter (ID) and length (L). The base plate dimensions are the diameter, the thickness, and the recess depth and gap thickness that is between the PZT ring and the base plate. The squirter transducer with the counter bore (recess) in the base produces a lower cavity resonance frequency ($f/f_o$ of 0.907) than that without the recess.

Moreover, the smaller transducer design with a counter bore (recess) produces the same cavity resonance frequency to that without the recess. The TVR levels are lower than without the recess because the added cavity length introduced by the recess is by passive and not active material.

TABLE 1

| | | Solid Base | Cutout Base | Smaller Cutout |
|---|---|---|---|---|
| PZT ring | OD/fo | 1 | 1 | 0.88 |
| PZT ring | ID/fo | 0.857 | 0.857 | 0.754 |
| PZT ring | L/fo | 0.614 | 0.614 | 0.54 |
| Baseplate | Diameter/fo | 1.143 | 1.143 | 1 |
| Baseplate | Thickness/fo | 0.286 | 0.286 | 0.286 |
| Baseplate | Cutout/fo | 0 | 0.143 | 0.143 |
| Gap (between piezoelectric ring and baseplate) | Gap/fo | 0.071 | 0.071 | 0.071 |
| Cavity Resonance | Fc/fo | 1 | 0.907 | 1 |

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A squirter transducer comprising:

a hollow cylindrical body having a first end and an open second end with an inner wall having an inner face and an outer face as well as an outer wall with an inner face and an outer face, said cylindrical body further having a rigid horizontal section with an inner face and an outer face between said inner wall and said outer wall at the open second end of said cylindrical body wherein said hollow cylindrical body is capable of containing a volume within the inner face of said inner wall;

a ceramic piezoelectric ring actuator positioned on an outer face of said inner wall and longitudinally adjacent to said inner wall, said piezoelectric ring actuator having a first horizontal end with width equal to a thickness of said piezoelectric ring actuator and a second horizontal end with a width equal to the thickness of said piezoelectric ring actuator;

a pressure release material positioned longitudinally adjacent to a side of said ceramic piezoelectric ring actuator opposite said inner wall to allow vibration of said piezoelectric ring actuator, said pressure release material having a first horizontal end with width equal to a thickness of said pressure release material and a second horizontal end with a width equal to the thickness of said pressure release material;

a rigid thin ring between the inner face of said horizontal section of said cylindrical body and the first horizontal end of said piezoelectric ring actuator;

a baseplate as a U-shape with a recess as an inner face affixed to an end of said inner wall of said cylindrical body with an upper portion of the U-shape of said base plate abutting the second end of said piezoelectric ring actuator wherein said baseplate is a solid mass having a thickness of fifty percent of a length of said cylindrical body and the recess having fifty percent of a thickness of said cylindrical body with a recess diameter equal to a diameter of the inner face of said inner wall of said cylindrical body; and a resonator cavity bounded by the second open end of said cylindrical body, the inner face of the inner wall of said cylindrical body and the inner face of the recess of said baseplate with the recess, capable of increasing an effective length of said resonator cavity with the result of increasing a bulk compliance and therefore reducing a resonance frequency of said resonator cavity without increasing an overall length of said transducer;

wherein the second horizontal end of said pressure release material is spaced apart from the upper portion of the U-shape of said base plate as a gap;

wherein said base plate is capable of blocking acoustic pressure from the first end of said cylindrical body so that acoustic energy is directed to the second open end of said cylindrical body and said resonator cavity;

wherein a portion of said rigid thin ring is located above said pressure release material.

* * * * *